June 8, 1926.
C. H. HOWELL
WEEDER
Filed March 22, 1923    3 Sheets-Sheet 2
1,588,230
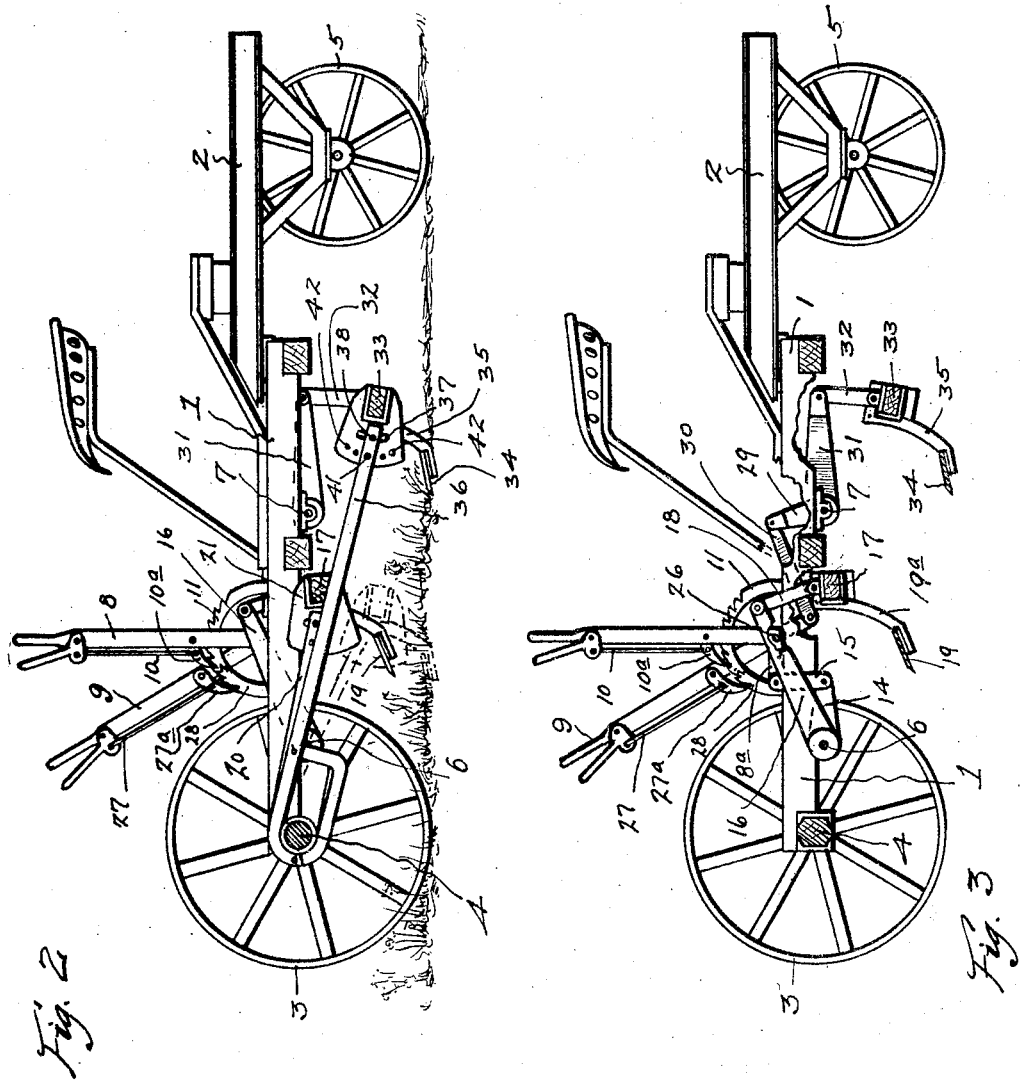
Inventor:
Columbus H. Howell
by          Atty.

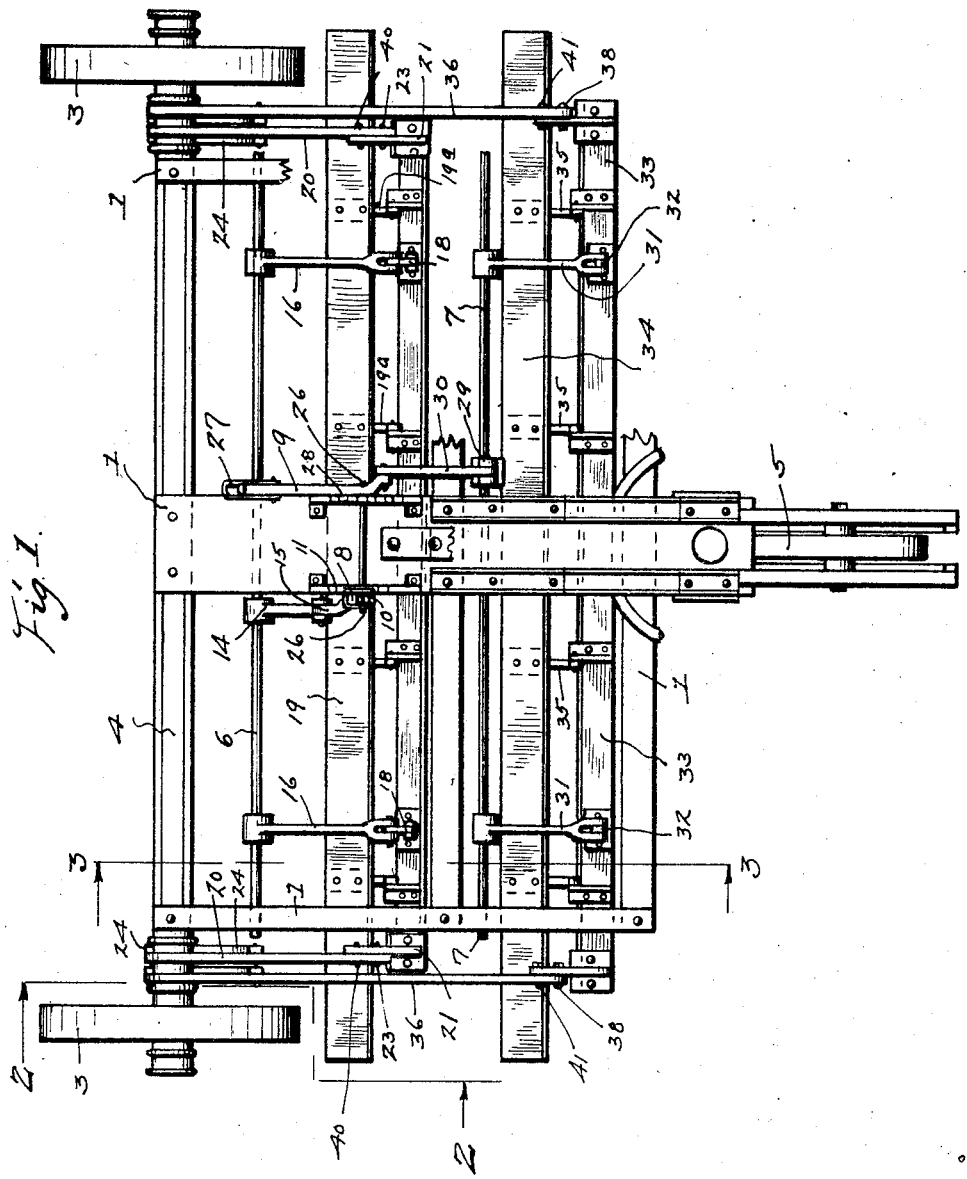

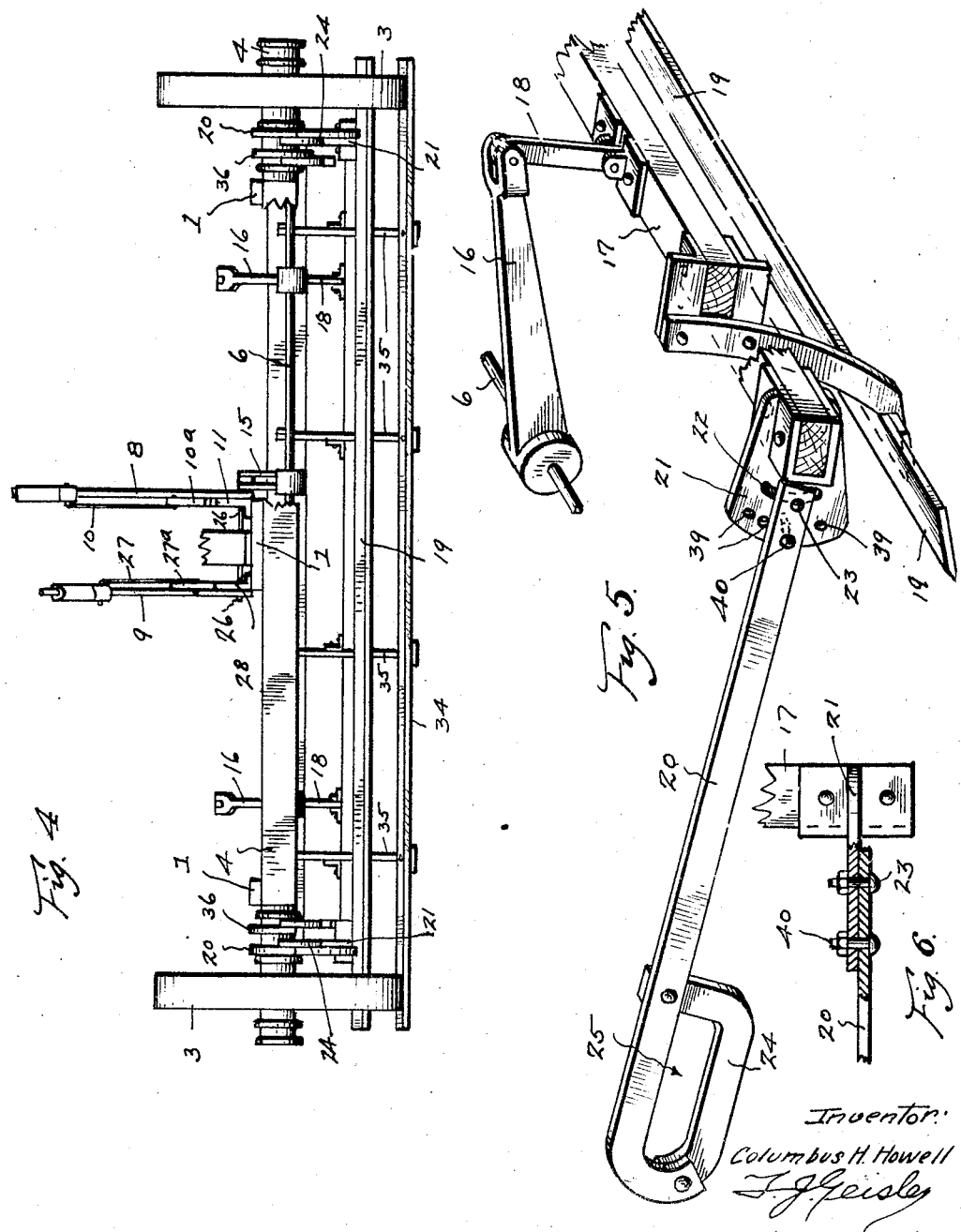

Patented June 8, 1926.

1,588,230

UNITED STATES PATENT OFFICE.

COLUMBUS H. HOWELL, OF PENDLETON, OREGON.

WEEDER.

Application filed March 22, 1923. Serial No. 626,884.

My invention relates to wheel mounted weeders which are provided with a horizontal knife or knives vertically adjustable which serve to cut the weeds a predetermined distance above the ground.

An incidental object of my invention is to provide a weeder of this type which is provided with two knife blades mounted one behind the other, and to provide means for placing said knife blades independently into and out of operative position. Thus one knife can be lifted out of operative position and the cut weeds removed from it while the other one is in operating position. The entire field can thus be cut evenly and continuously without leaving spots of uncut weeds, or else without stopping the cutting operations to remove weeds from the knife.

The primary object of my invention is to provide means whereby the cutting knives may be readily lowered and raised into and out of operative position, and will be firmly held in the latter position against any twisting strain.

A further object of my invention is to attain the said result by inexpensive means.

I attain this object in a wheel mounted implement which has two transverse knife blades located one behind the other, each of said bars carrying a cutting element. I provide pivoted bracing rods connecting the cutting elements with the front end of the implement which are adapted to sustain the stresses imposed upon said knife blades while in action. Independent adjusting mechanisms are provided which are controlled by operating handles, arranged adjacent the driving seat and thus accessible to the driver, whereby the transverse cutting elements can be lifted independently into and out of operative position.

I illustrate these and other features in the accompanying drawings, in which:

Fig. 1 is a plan view of my improved weeder with part of the superstructure broken away to show the operating mechanism underneath;

Fig. 2 is a section taken on the line 2—2 of Fig. 1 and shows the cutting elements with their control mechanism and also shows in dotted lines, the foremost cutting element lowered into operative position;

Fig. 3 is a section taken substantially on the line 3—3 of Fig. 1 and shows the independent adjusting mechanism by which the cutting elements are raised and lowered;

Fig. 4 is a front elevation of my improved weeder with parts of the bracing structure broken away to show the operating mechanism;

Fig. 5 is an enlarged fragmentary perspective view showing the pivoted rods which sustain the stresses of the cutting elements while in action; and Fig. 6 is a fragmentary section showing details of construction.

My weeder is made with a frame 1 which has a pivoted bifurcate rear extension 2. The weeder is wheel mounted with front wheels 3 which are mounted on an axle 4. The rear wheel 5, is journaled between this bifurcate rear extension portion and thus accommodates the swing of the device in turning corners. Shafts are journaled transversely of the frame, 6 being a front shaft and 7 a rear shaft. A hand lever 8 controls the front shaft 6 and a rear rack hand lever 9 controls the rear rack shaft 7. The usual latching means 10 with a pawl $10^a$ which cooperates with the circular rack bar 11, holds the lever 8 in set position. The hand lever 8 is L-shaped and pivoted to the frame at 26 and its lower end $8^a$ is pivotally connected to an arm 14. This arm 14 is rigidly fastened to the shaft 6 and the connection to the lower end $8^a$ is made thru a doubly pivoted link 15. Lifting arms 16 are also keyed to the shaft 6 and will thus turn therewith when the shaft is rotated. Each of these arms 16 is pivotally connected to the transverse bar 17 thru a doubly pivoted link 18. The cutting blade 19 is fastened to the transverse bar 17 by hangers $19^a$. Said cutting blade extends transverse of the frame and parallel to the transverse bar 17. Said blade is disposed angularly to the surface of the ground when in operative position and this set degree of angularity is maintained by bracing rods 20 at each side of the frame, one end of each of said bracing rods being pivotally mounted upon the axle 4. These bracing rods sustain all of the stresses imposed upon the cutting elements while in action. The free end of each of these arms is connected to the blades by being rigidly fastened to a bracket 21 on the cross arm 17.

The connection between the bracing rods and the brackets is adjustable so that the angle that the rods make with their respective brackets can be varied. This adjustment is secured thru the provision of an arcuate slot 22 in the bracket thru which the bolt 23 or the bracing rod 20 passes, and by the provision of spaced holes 39 thru which the bolt 40 passes. The arcs for said slot and for said holes being described about the same point.

The pivoted end of each of said bracing rods 20 is formed into a loop 25 elongated to permit the bracing rod to move longitudinally upon the axle, as when turning a corner. This loop is preferably made in two sections, one of which 24 is removable to permit the disengagement of said bracing rods from said axle. The width of the loop 25 thus formed is substantially the same as the diameter of the axle so as to ride thereon without play.

When the bolt 23 in the slot 22 and the bolt 40 in one of the holes 39 are both tightened, the degree of angularity of the cutting blade and the bracing arm 20 is set, and the connection will hold the cutter bar 19 in set position, relatively to the transverse bar 17. The only function of the hand lever 8 and its connections is to move the cutting blade 19 to and from the ground. The hand lever 9 is a straight lever and is pivoted at 26 and is provided with the usual locking means 27.

The pawl 27ª co-acts with the circular rack 28 and holds the hand lever in set position. The lever 9 is connected to the arm 29 by the doubly pivoted link 30. This arm 29 is rigidly fastened to the shaft 7 to which are also fastened the lifting arms 31. A doubly pivoted link 32 connects each lifting arm 31 to the rear transverse bar 33. The rear cutting blade 34 is connected to this transverse bar 33 by hangers 35, similarly to the parts mentioned for the front cutting blades. Pivoted bracing arms 36 mounted one at each side of the frame are pivotally mounted upon the axle 4 and sustain the stresses imposed upon the cutting bar 34 when in action. The degree of angularity of the cutting blade 34 is adjusted by tightening the bolt 38 in the arcuate slot 37 with the adjustable bolt 38 and by inserting and tightening the bolt 41 in one of the holes 42. The lever 9 merely moves the transverse bar 33 towards and away from the ground and the arms 36 hold the transverse bar 33, and therefore the cutting blade 34, in set position, so that they can not twist about and thus change their degree of angularity with the ground.

I claim:

1. In an implement of the character described, a wheel mounted frame, earth working implements, means for suspending said implements from the frame in active and inactive positions, bracing rods at each side of said frame, rigidly connected, respectively, at one end to said implements, the other ends of said rods being provided with elongated loops having two parallel sides, one of which is removable, the spacing of said parallel sides coinciding with the diameter of the front axle, which extends through said loops.

2. In an implement of the character described, a frame mounted on front and rear wheels, a plurality of earth working implements arranged one behind the other and each comprising means for suspending said implements from the frame in active and inactive positions, bracing rods at each side of said frame, rigidly connected, respectively, at one end to said implements, the other ends of said rod being connected to the front wheel axle by means permitting said rods rotary and longitudinal movement on said axle, means for positioning the said suspending means independently.

COLUMBUS H. HOWELL.